United States Patent
Nilsson et al.

(10) Patent No.: US 11,095,347 B1
(45) Date of Patent: Aug. 17, 2021

(54) TRANSMISSION OF A TWO-PORT REFERENCE SIGNAL

(71) Applicant: Telefonaktiebolaget LM Ericsson (publ), Stockholm (SE)

(72) Inventors: Andreas Nilsson, Gothenburg (SE); Sven Petersson, Sävedalen (SE); Fredrik Athley, Kullavik (SE); Niklas Wernersson, Kungsängen (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/973,139

(22) PCT Filed: Jun. 12, 2018

(86) PCT No.: PCT/EP2018/065439
§ 371 (c)(1),
(2) Date: Dec. 8, 2020

(87) PCT Pub. No.: WO2019/238216
PCT Pub. Date: Dec. 19, 2019

(51) Int. Cl.
*H04B 7/0456* (2017.01)
*H04L 5/00* (2006.01)
(Continued)

(52) U.S. Cl.
CPC ......... *H04B 7/0469* (2013.01); *H04B 7/0684* (2013.01); *H04B 7/10* (2013.01); *H04L 5/0048* (2013.01)

(58) Field of Classification Search
CPC ...... H04B 7/0469; H04B 7/0684; H04B 7/10; H04L 5/0048
See application file for complete search history.

(56) References Cited

U.S. PATENT DOCUMENTS

| 9,331,386 B2 | 5/2016 | Wernersson et al. |
| 2015/0333885 A1* | 11/2015 | Athley ................. H04B 7/0658 375/219 |

(Continued)

FOREIGN PATENT DOCUMENTS

WO   WO-2016141961 A1 * 9/2016 ......... H01Q 21/0025

OTHER PUBLICATIONS

International Search Report and Written Opinion of the International Searching Authority for PCT International Application No. PCT/EP2018/065439 dated Feb. 25, 2019.

(Continued)

*Primary Examiner* — David B Lugo
(74) *Attorney, Agent, or Firm* — Sage Patent Group

(57) ABSTRACT

There is provided mechanisms for transmitting a two-port reference signal from an analog antenna array of an antenna arrangement. The analog antenna array comprises antenna elements of two polarizations. All antenna elements of each polarization are connected to a respective physical antenna port. A method comprises generating two virtual antenna ports, one for each of the two ports of the reference signal. The method comprises feeding the reference signal from the two virtual antenna ports to the two physical antenna ports via a virtualization network. The method comprises transmitting, via the antenna elements, the reference signal from the two physical antenna ports over a composite beamwidth in different spatial coverage per polarization for each of the two physical antenna ports whereby the transmitted reference signal, over the composite beamwidth, varies between having rank 1 and rank 2.

20 Claims, 7 Drawing Sheets

(51) Int. Cl.
*H04B 7/10* (2017.01)
*H04B 7/06* (2006.01)

(56) References Cited

U.S. PATENT DOCUMENTS

2017/0250745 A1    8/2017  Athley et al.
2019/0305837 A1*  10/2019  Onggosanusi ........ H04W 24/10

OTHER PUBLICATIONS

Tateishi et al., "Indoor Experiment on 5G Radio Access Using Beam Tracking at 15 GHz Band in Small Cell Environment," 2016 IEEE 27th Annual International Symposium on Personal, Indoor, and Mobile Radio Communications (PIMRC), Sep. 2016, 6 pages.

* cited by examiner

TRANSMISSION OF A TWO-PORT REFERENCE SIGNAL

CROSS REFERENCE TO RELATED APPLICATION

This application is a 35 U.S.C. § 371 national stage application of PCT International Application No. PCT/EP2018/065439 filed on Jun. 12, 2018, the disclosure and content of which is incorporated by reference herein in its entirety.

TECHNICAL FIELD

Embodiments presented herein relate to a method, a radio transceiver device, a computer program, and a computer program product for transmitting a two-port reference signal from an analog antenna array of an antenna arrangement.

BACKGROUND

In communications networks, there may be a challenge to obtain good performance and capacity for a given communications protocol, its parameters and the physical environment in which the communications network is deployed.

For example, for future generations of mobile communications networks, frequency bands at many different carrier frequencies could be needed. For example, low such frequency bands could be needed to achieve sufficient network coverage for wireless devices and higher frequency bands (e.g. at millimeter wavelengths (mmW), i.e. near and above 30 GHz) could be needed to reach required network capacity. In general terms, at high frequencies the propagation properties of the radio channel are more challenging and beamforming both at the network node of the network and at the wireless devices might be required to reach a sufficient link budget.

Narrow beam transmission and reception schemes might be needed at such high frequencies to compensate the expected high propagation loss. For a given communication link, a respective beam can be applied at both the network-end (as represented by a network node or its transmission and reception point, TRP) and at the terminal-end (as represented by a terminal device), which typically is referred to as a beam pair link (BPL). One task of the beam management procedure is to discover and maintain beam pair links. A BPL (as defined by the beam used by the network node and the beam used by the terminal device) is expected to be discovered and monitored by the network using measurements on downlink reference signals, such as channel state information reference signals (CSI-RS) or synchronization signal block (SSB) signals, used for beam management.

The reference signals for beam management can be transmitted periodically, semi-persistently or aperiodically (event triggered) and they can be either shared between multiple terminal devices or be device-specific. In order for the terminal device to find a suitable network node beam, the network node transmits the reference signal in different transmission (TX) beams on which the terminal device performs measurements, such as reference signal received power (RSRP), and reports back the N best TX beams (where N can be configured by the network). Furthermore, the transmission of the reference signal on a given TX beam can be repeated to allow the terminal device to evaluate a suitable reception (RX) beam.

One advantage with using periodic CSI-RS compared to SSB for the periodic beam management procedure is that the periodic CSI-RS can be dedicated for only this purpose. Hence the number of beams, the beamwidth of the beams, and the periodicity of the periodic beam management procedure can be more flexible. Another advantage is that the CSI-RS can be transmitted over the full frequency band which will give a better estimate of the preferred TX beam. Yet another advantage is that CSI-RS resources used for beam management can utilize two ports which means that one port can be transmitted per polarization. In turn, this will lead to more reliable beam selections. With single polarized reference signals, such as SSB or single port CSI-RS resources, there is a risk of polarization mismatching which might lead to wrong beam selection. Measurements have shown that different polarizations can have different best beams.

Typically the beamwidth, when using all antenna elements and with unit weights, is closely related to the size of the antenna aperture used to create the beam. As a rule-of-thumb, the beamwidth is $50\lambda/D$ degrees where $\lambda$ is the wavelength and D is the width of the aperture. By applying phase and/or amplitude tapering the beamwidth can be somewhat larger. So-called Dual Polarization BeamForming (DPBF), see WO2011/0500866A1 and WO2016/141961 A1, can be used in order to have significantly larger beamwidths and without losing a significant amount of output power due to amplitude tapering. However, when DPBF utilizes both polarizations to form a single port with the desired beamshape (or power pattern) it is not possible to generate two-port reference signal from a single, two-port, analog antenna array where the ports have the same desired beamshape and orthogonal polarizations.

Hence, there is still a need for improved transmission of reference signals.

SUMMARY

An object of embodiments herein is to provide efficient transmission of a two-port reference signal that does not suffer from the issues noted above, or at least where the above noted issues are reduced or mitigated.

According to a first aspect there is presented a method for transmitting a two-port reference signal from an analog antenna array of an antenna arrangement. The analog antenna array comprises antenna elements of two polarizations. All antenna elements of each polarization are connected to a respective physical antenna port. The method comprises generating two virtual antenna ports, one for each of the two ports of the reference signal. The method comprises feeding the reference signal from the two virtual antenna ports to the two physical antenna ports via a virtualization network. The method comprises transmitting, via the antenna elements, the reference signal from the two physical antenna ports over a composite beamwidth in different spatial coverage per polarization for each of the two physical antenna ports whereby the transmitted reference signal, over the composite beamwidth, varies between having rank 1 and rank 2.

According to a second aspect there is presented a radio transceiver device for transmitting a two-port reference signal from an analog antenna array of an antenna arrangement. The analog antenna array comprises antenna elements of two polarizations. All antenna elements of each polarization are connected to a respective physical antenna port. The radio transceiver device comprises processing circuitry. The processing circuitry being configured to cause the radio transceiver device to generate two virtual antenna ports, one for each of the two ports of the reference signal. The processing circuitry being configured to cause the radio transceiver device to feed the reference signal from the two virtual antenna ports to the two physical antenna ports via a virtualization network. The processing circuitry being configured to cause the radio transceiver device to transmit, via the antenna elements, the reference signal from the two physical antenna ports over a composite beamwidth in different spatial coverage per polarization for each of the two physical antenna ports whereby the transmitted reference signal, over the composite beamwidth, varies between having rank 1 and rank 2.

According to a third aspect there is presented a radio transceiver device for transmitting a two-port reference signal from an analog antenna array of an antenna arrangement. The analog antenna array comprises antenna elements of two polarizations. All antenna elements of each polarization are connected to a respective physical antenna port. The radio transceiver device comprises a generate module configured to generate two virtual antenna ports, one for each of the two ports of the reference signal. The radio transceiver device comprises a feed module configured to feed the reference signal from the two virtual antenna ports to the two physical antenna ports via a virtualization network. The radio transceiver device comprises a transmit module configured to transmit, via the antenna elements, the reference signal from the two physical antenna ports over a composite beamwidth in different spatial coverage per polarization for each of the two physical antenna ports whereby the transmitted reference signal, over the composite beamwidth, varies between having rank 1 and rank 2.

Advantageously this provides efficient transmission of a two-port reference signal.

Advantageously this method and radio transceiver device enable two-port reference signal to be attained with quasi orthogonal polarization, instead of attaining just one single-port reference signal with one polarization. When transmitted as part of a beam management procedure the two-port reference signal enables the beam selection to be more robust to polarization miss-matching.

Advantageously, having a two-port reference signal, despite the fact that the ports not necessarily are perfectly orthogonal, makes it possible for rank 2 transmissions in those directions where the ports show sufficient orthogonality and strength.

According to a fourth aspect there is presented a computer program for transmitting a two-port reference signal from an analog antenna array of an antenna arrangement, the computer program comprising computer program code which, when run on a radio transceiver device, causes the radio transceiver device to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
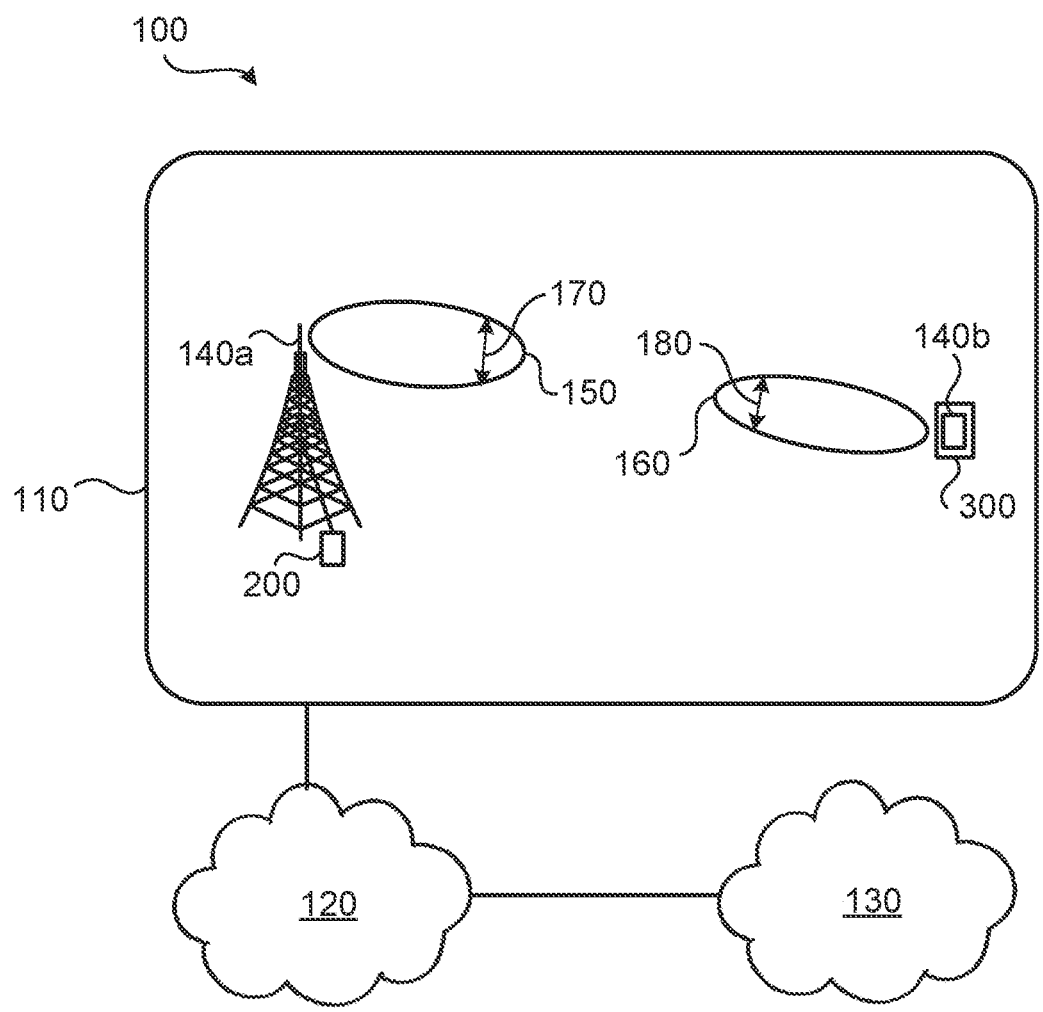
FIG. 1 is a schematic diagram illustrating a communications network according to embodiments.

FIG. 1 is a schematic diagram illustrating a communications network 100 where embodiments presented herein can be applied. The communications network 100 could be a third generation (3G) telecommunications network, a fourth generation (4G) telecommunications network, or a fifth (5G) telecommunications network and support any 3GPP telecommunications standard, where applicable.

The communications network 100 comprises a radio transceiver device embodied as a network node 200 configured to provide network access to at least one radio transceiver device embodied as terminal device 300 in a radio access network 110. The radio access network 110 is operatively connected to a core network 120. The core network 120 is in turn operatively connected to a service network 130, such as the Internet. The terminal device 300 is thereby enabled to access services of, and exchange data with, the service network 130.

Examples of network nodes 200 are radio access network nodes, radio base stations, base transceiver stations, Node Bs, evolved Node Bs, g Node Bs, access points, and access nodes, and backhaul nodes. Examples of terminal devices 300 are wireless devices, mobile stations, mobile phones, handsets, wireless local loop phones, user equipment (UE), smartphones, laptop computers, tablet computers, network equipped sensors, network equipped vehicles, and so-called Internet of Things devices.

The network node 200 and/or the terminal device 300 each comprises, is collocated with, integrated with, or in operational communications with, a respective antenna arrangement 140a, 140b.

The network node 200 and/or the terminal device 300 might be configured to communicate with each other in beams 150, 160 as generated by the radio antenna arrangements 140a, 140b. Each beam has a beamwidth, as schematically illustrated at 170, 180. In this respect, the radio antenna arrangements 140a, 140b might be configured for transmission in orthogonal, or quasi-orthogonal, polarizations. The beamwidth 170, 180 is hereinafter denoted a composite beamwidth in order to refer to the beamwidth collectively spanned by the two polarizations. In further detail, the composite beamwidth might be regarded as the beamwidth for the total power radiation pattern for the reference signal. For each port of the two-port reference signal a total power radiation pattern, per port, is found as the sum of the power per polarization. Finally, the total radiation power pattern for the two-port reference signal is found as the sum of the power patterns per port.

Further, the network node 200 and the terminal device 300 could be configured to communicate with each other using a variety of beams having different shapes and widths, herein generally referred to as having different beam patterns.

Figure 2:
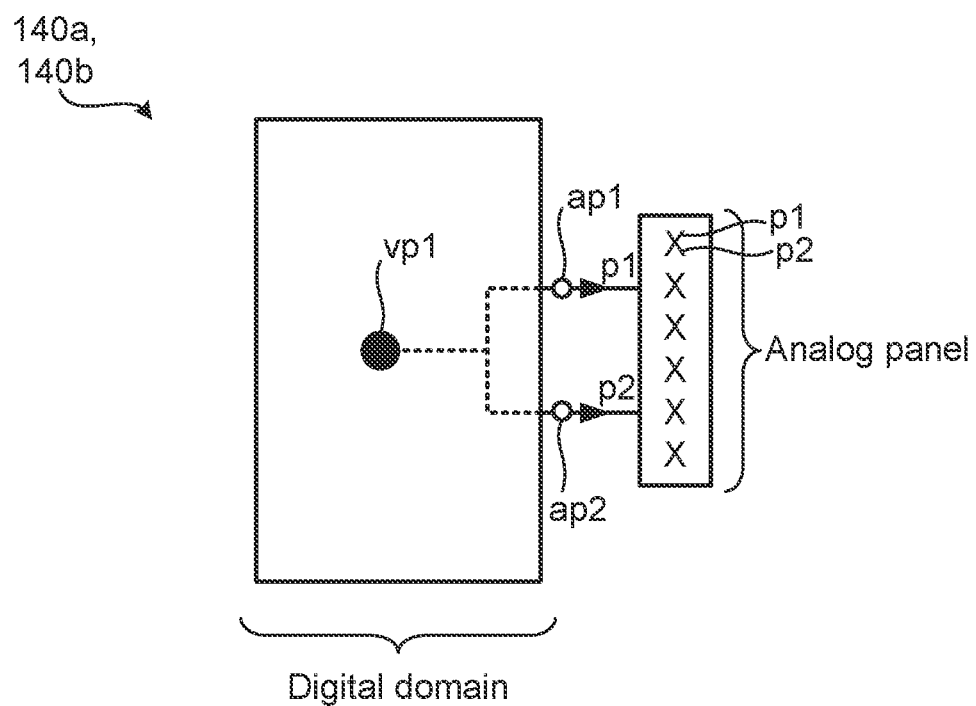
FIGS. 2, 3, and 4 schematically illustrates antenna arrangements according to embodiments.
Figure 3:
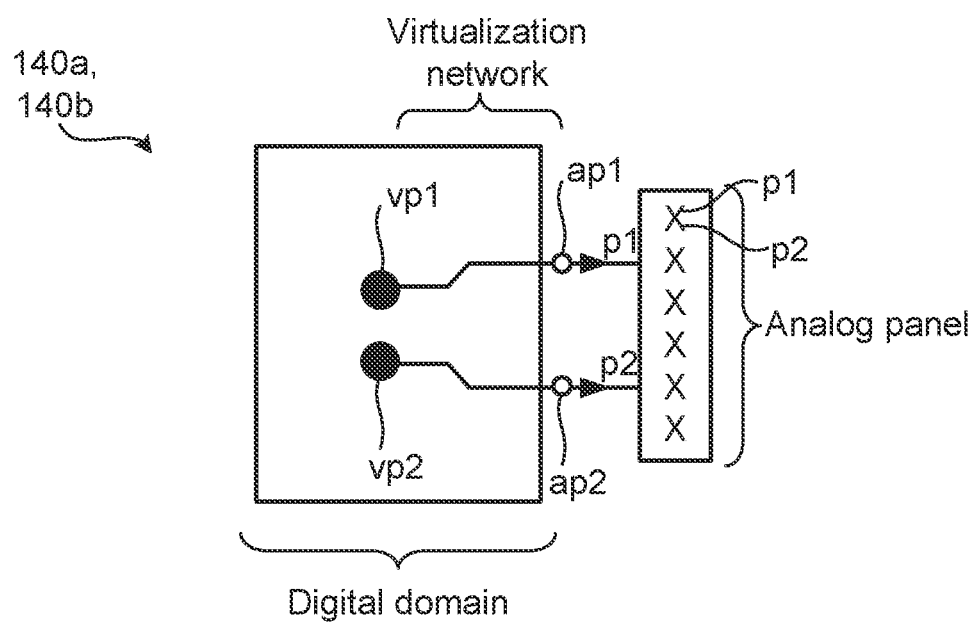
Figure 4:
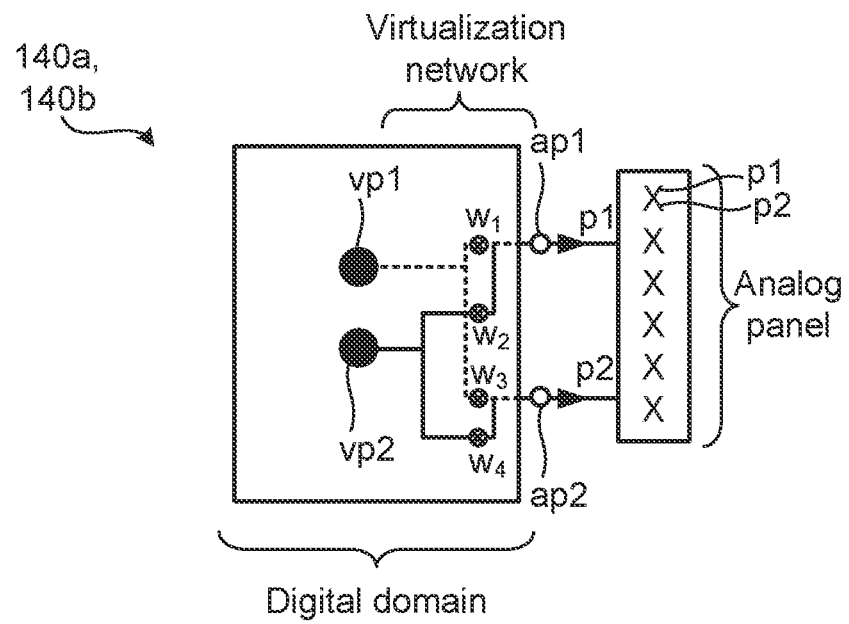

FIGS. 2, 3, and 4 schematically illustrate antenna arrangements 140, 140a, 140b.

In the example of FIG. 2, one singe virtual antenna port (vp1) is generated in the digital domain. For signal transmission, a signal is then fed from this virtual antenna port to two physical antenna ports (ap1, ap2), where each physical antenna port is connected to all antenna elements of a respective polarization (p1, p2) at an analog antenna array. There are thus two analog feed networks, one per polarization. The feed networks are designed such that the total power, defined as the sum of the power over both polarizations, has the desired beam pattern. Since only one single virtual antenna port is be used, this means that the reference signal resource (e.g. used for beam management) will have one reference signal port and hence be single polarized. That is, in each direction the reference signal resource only has one polarization, but the polarization will be different between different directions. In this respect, if the weights are the same for both polarizations the resulting polarization will not be different in different directions. But, with same weights in both polarization, two reference signals would be transmitted.

In the examples of FIGS. 3 and 4, two virtual antenna ports (vp1, vp2) are generated in the digital domain. For signal transmission, a respective signal is then fed from these virtual antenna ports to two physical antenna ports (ap1, ap2), where each physical antenna port, as in FIG. 2, is connected to all antenna elements of a respective polarization (p1, p2) at an analog antenna array via a virtualization network. In FIG. 3, each virtual antenna port is only coupled to a respective single (or in other words, its own) physical antenna port, whereas in FIG. 4, each virtual antenna port is coupled to both physical antenna ports via weights (as below defined according to matrix elements $w_1$, $w_2$, $w_3$, $w_4$). Having two virtual antenna ports enable the use of reference signal resources with two reference signal ports. As will be further disclosed below, the examples in FIGS. 3 and 4 both enable transmission of a reference signal resource from two virtual ports at the cost of either different coverage (FIG. 3) or non-orthogonal polarizations (FIG. 4) for the two virtual antenna ports.

In further detail, embodiments disclosed herein relate to mechanisms for transmitting a two-port reference signal from an analog antenna array of an antenna arrangement 140a, 140b. In order to obtain such mechanisms there is provided a radio transceiver device 200, 300, a method performed by the radio transceiver device 200, 300, a computer program product comprising code, for example in the form of a computer program, that when run on a radio transceiver device 200, 300, causes the radio transceiver device 200, 300 to perform the method.

Figure 5:
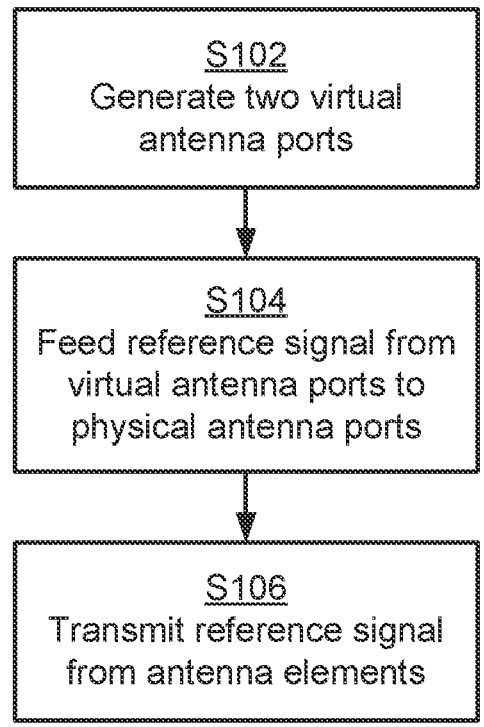
FIG. 5 is a flowchart of methods according to embodiments.

Reference is now made to FIG. 5 with continued parallel reference to FIGS. 3 and 4. FIG. 5 is a flowchart illustrating embodiments of methods for transmitting a two-port reference signal from an analog antenna array of an antenna arrangement 140a, 140b. In this respect, an analog antenna array might be defined as an antenna array with an analog feed network. The analog antenna array comprises antenna elements of two polarizations. All antenna elements of each polarization are connected to a respective physical antenna port. The methods are performed by the radio transceiver device 200, 300. The methods are advantageously provided as computer programs 1420.

S102: The radio transceiver device 200, 300 generates two virtual antenna ports, one for each of the two ports of the reference signal.

S104: The radio transceiver device 200, 300 feeds the reference signal from the two virtual antenna ports to the two physical antenna ports via a virtualization network.

S106: The radio transceiver device 200, 300 transmits, via the antenna elements, the reference signal from the two physical antenna ports over a composite beamwidth 170, 180 in different spatial coverage per polarization for each of the two physical antenna ports whereby the transmitted reference signal, over the composite beamwidth 170, 180, varies between having rank 1 and rank 2.

This enables transmission of a two-port reference signal where the reference signal has rank 1 in some directions and rank 2 in some (other) directions.

Thus, by appropriate phase setting of the virtualization weights between the two virtual antenna ports (as used for two-port reference signal transmission) and the two physical antenna ports, it is possible to generate two reference signal ports at the cost of quasi-orthogonal polarization or non-equal coverage.

Embodiments relating to further details of transmitting the two-port reference signal from the analog antenna array of the antenna arrangement 140a, 140b as performed by the radio transceiver device 200, 300 will now be disclosed.

There may be different ways to enable the transmitted reference signal to, over the composite beamwidth 170, 180, vary between having rank 1 and rank 2. Different embodiments relating thereto will now be described in turn.

A first embodiment for enabling the transmitted reference signal to, over the composite beamwidth 170, 180, vary between having rank 1 and rank 2 will now be disclosed. Special reference is made to the antenna arrangement 140a, 140b of FIG. 3.

As disclosed above, the virtual antenna ports might have orthogonal polarization but the coverage will be different for the different virtual antenna ports. Particularly, according to an aspect of the first embodiment the transmitted reference signal, over the composite beamwidth 170, 180, varies between having rank 1 and rank 2 by that the two ports of the reference signal have mutually different spatial coverage of over the composite beamwidth 170, 180.

That the two ports of the reference signal have mutually different spatial coverage of over the composite beamwidth 170, 180 might require the two virtual antenna ports to have different power patterns. That is, in some aspects the power patterns for the two virtual antenna ports are mutually different. Hence, according to an aspect of the first embodiment the two virtual antenna ports have mutually different power patterns over the composite beamwidth 170, 180.

In some aspects the power patterns complement each other in order to enable maximum coverage. Hence, according to an aspect of the first embodiment the mutually different power patterns are mutually complementary.

As in FIG. 3, each virtual antenna port might be coupled only to its own physical antenna port. That is, according to an aspect of the first embodiment, each of the two virtual antenna ports, via the virtualization network, only is operatively connected so as to feed a respective one of the two physical antenna ports.

A second embodiment for enabling the transmitted reference signal to, over the composite beamwidth 170, 180, vary between having rank 1 and rank 2 will now be disclosed. Special reference is made to the antenna arrangement 140a, 140b of FIG. 4.

In some aspects, the orthogonality is different in different spatial directions. Particularly, according to an aspect of the second embodiment, the transmitted reference signal, over the composite beamwidth 170, 180, varies between having rank 1 and rank 2 by that the two ports of the reference signal have varying polarization orthogonality over the composite beamwidth 170, 180.

In some aspects the power patterns for the two virtual antenna ports are identical whereas the two ports of the reference signal have varying polarization orthogonality over the composite beamwidth 170, 180. Particularly, according to an aspect of the second embodiment the two virtual antenna ports have identical power patterns.

As in FIG. 4, both virtual antenna ports might be coupled to both physical antenna ports with non-zero weights. Particularly, according to an aspect of the second embodiment each of the two virtual antenna ports, via the virtualization network, is operatively connected so as to feed both of the two physical antenna ports.

There could be different virtualization networks enabling each of the two virtual antenna ports to be operatively connected so as to feed both of the two physical antenna ports. In some aspects, the virtualization network is defined by weighting matrix. Particularly, according to an aspect of the second embodiment the virtualization network is defined by a weighting matrix W, such that:

$$\begin{bmatrix} y_1 \\ y_2 \end{bmatrix} = W \begin{bmatrix} x_1 \\ x_2 \end{bmatrix},$$

where $y_1$ represents a first of the two physical antenna ports, where $y_2$ represents a second of the two physical antenna ports, where $x_1$ represents a first of the two virtual antenna ports, and where $x_2$ represents a second of the two virtual antenna ports.

In general terms, the weighting matrix W is composed of matrix elements $w_1, w_2, w_3, w_4$ such that $$W = \begin{bmatrix} w_1 & w_2 \\ w_3 & w_4 \end{bmatrix}.$$

There could be different ways to set the values of the matrix elements $w_1, w_2, w_3, w_4$. According to an aspect of the second embodiment the weighting matrix W is given by:

$$W = \frac{1}{\sqrt{2}} \begin{bmatrix} e^{i\varphi_{11}} & e^{i\varphi_{21}} \\ 1 & e^{i\varphi_{22}} \end{bmatrix},$$

where $\varphi_{11}, \varphi_{21}, \varphi_{22}$, are phase shift values. Hence, the first physical antenna port is formed by combining the two virtual antenna ports and by introducing two phase shifts, $\varphi_{11}$ and $\varphi_{21}$, where $\varphi_{11}$ can be used to set the polarization state for the first physical antenna port and $\varphi_{21}$ in combination with $\varphi_{22}$ is used to control the polarization orthogonality between the two physical antenna ports.

In some aspects it is the phase difference, defined as $\varphi_{21}-\varphi_{11}-\varphi_{22}$, that affects the polarization orthogonality. This implies that there is only one degree of freedom. Particularly, according to an aspect of the second embodiment, $\varphi_{21}-\varphi_{11}-\varphi_{22}$ takes a value in the interval: $[0, \ldots, 2\pi]$. Further, according to an aspect of the second embodiment, $\varphi_{21}-\varphi_{11}-\varphi_{22}=\pi$.

When an orthogonal cover code (OCC) is used, the same reference symbol is transmitted over both virtual ports with a precoder $[1\ 1]^T$ in one symbol/subcarrier/resource element and with a precoder $[1\ -1]^T$ in another symbol/subcarrier/resource element. By means of the virtualization network the two virtual antenna ports share the same power resource, such as one power amplifier per physical antenna port. This might cause non-equal load of the power amplifiers when applying OCC. To assure even load of the power amplifiers for the OCC precoders, let $\varphi_{21}=\varphi_{11}+\pi/2$ and let $\varphi_{22}=-\pi/2$. Hence, according to an aspect of the second embodiment the weighting matrix W is given by:

$$W = \frac{1}{\sqrt{2}} \begin{bmatrix} e^{i\varphi_{11}} & e^{i(\varphi_{11}+\pi/2)} \\ 1 & e^{-i\pi/2} \end{bmatrix},$$

where $\varphi_{11}$ is a phase shift value. Thereby the weighting matrix W enables maximization of polarization orthogonality between the virtual antenna ports and makes the power amplifiers carry equal load no matter if OCC is applied or not.

Aspects, embodiments, and examples relating to both the first embodiment and the second embodiment will now be disclosed.

There could be different ways to set the polarizations of the antenna elements. In some aspects the antenna elements of the two physical antenna ports have mutually orthogonal polarization. Hence, according to an embodiment the two polarizations are mutually orthogonal.

There could be different situations and scenarios in which the reference signal is transmitted. For example, the reference signal might be transmitted as part of a beam management procedure. As disclosed above with reference to FIG. 1, the antenna arrangement 140a, 140b might part of, collocated with, integrated with, or operatively connected to, a network node 200 and/or a terminal device 300.

Aspects where the antenna arrangement 140a is part of a network node 200 will now be disclosed.

There could be different types of reference signals in scenarios where the antenna arrangement 140a is part of a network node 200. As an example, the reference signal might be a channel state information reference signal (CSI- RS), a cell-specific reference signal (CRS), or be part of a synchronization signal block (SSB). The reference signals could be transmitted by the network node 200 as part of the network node 200 performing a beam management procedure, where the network node 200 transmits the reference signal in different TX beams.

Aspects where the antenna arrangement 140b is part of a terminal device 300 will now be disclosed.

There could be different types of reference signals in scenarios where the antenna arrangement 140b is part of a terminal device 300. As an example, the reference signal might be a sounding reference signal (SRS). The reference signals could be transmitted by the terminal device 300 as part of the terminal device 300 participating in a beam management procedure, where the terminal device 300 transmits the reference signal in different TX beams.

Simulation results will now be discussed with reference to FIGS. 6 to 11.

Figure 6:
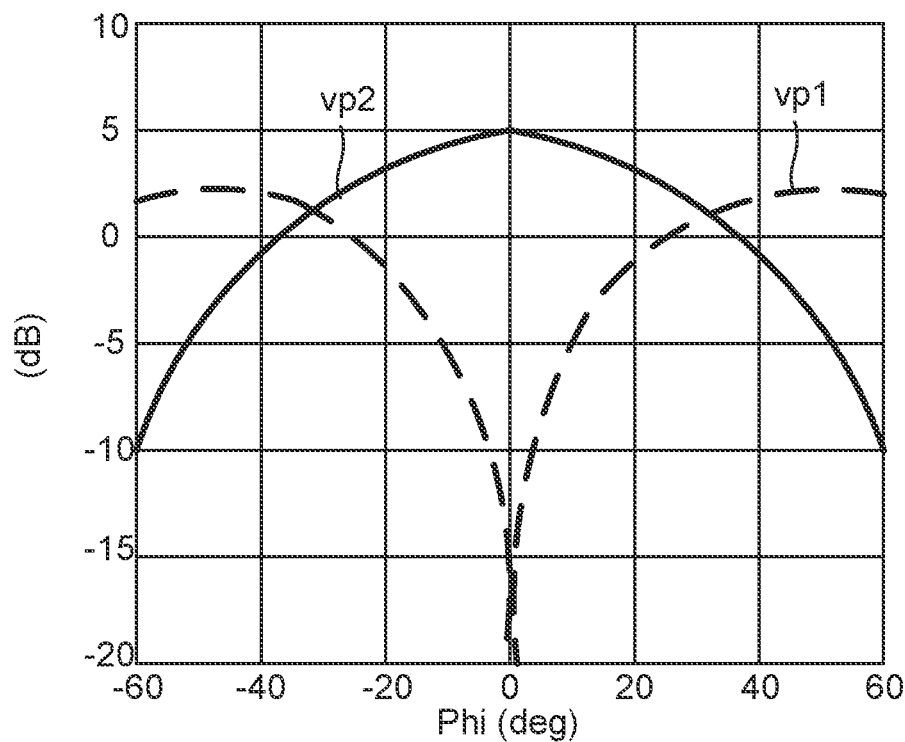
FIGS. 6 to 11 show simulation results according to embodiments.

FIG. 6 schematically shows the power patterns, in terms of azimuth cut only, of the two virtual antenna ports (vp1, vp2) according to the first embodiment. As shown in the figure, the two virtual antenna ports have mutually different power patterns over the composite beamwidth. Further, the power patterns complement each other in order to enable maximum coverage.

Figure 7:
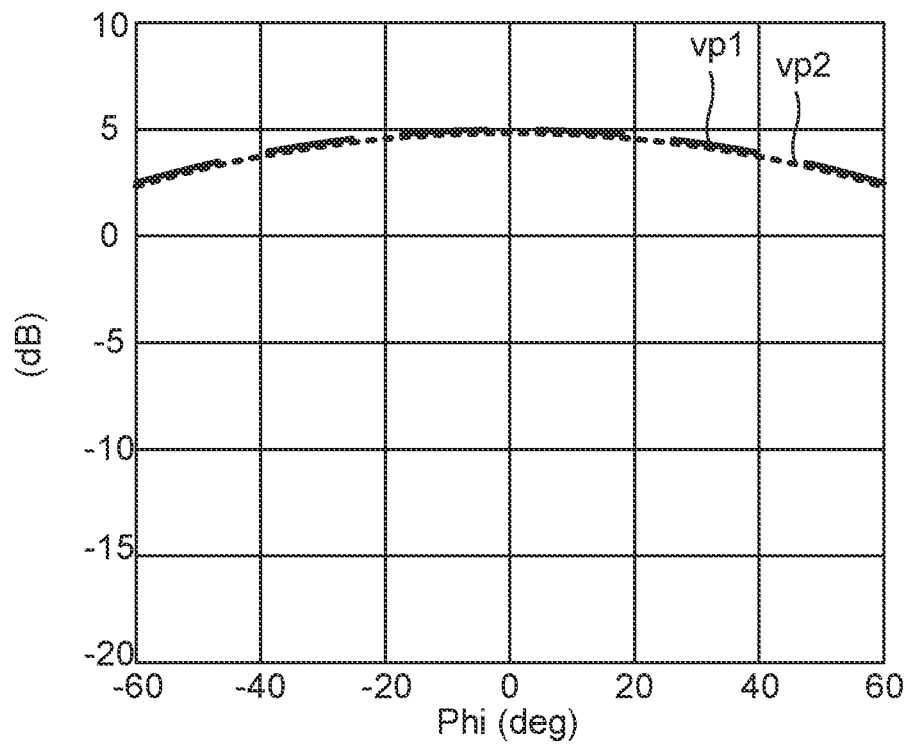

FIG. 7 schematically shows the power patterns, in terms of azimuth cut only, of the two virtual antenna ports (vp1, vp2) according to the second embodiment. As shown in the figure, the two virtual antenna ports have identical power patterns.

Figure 8:
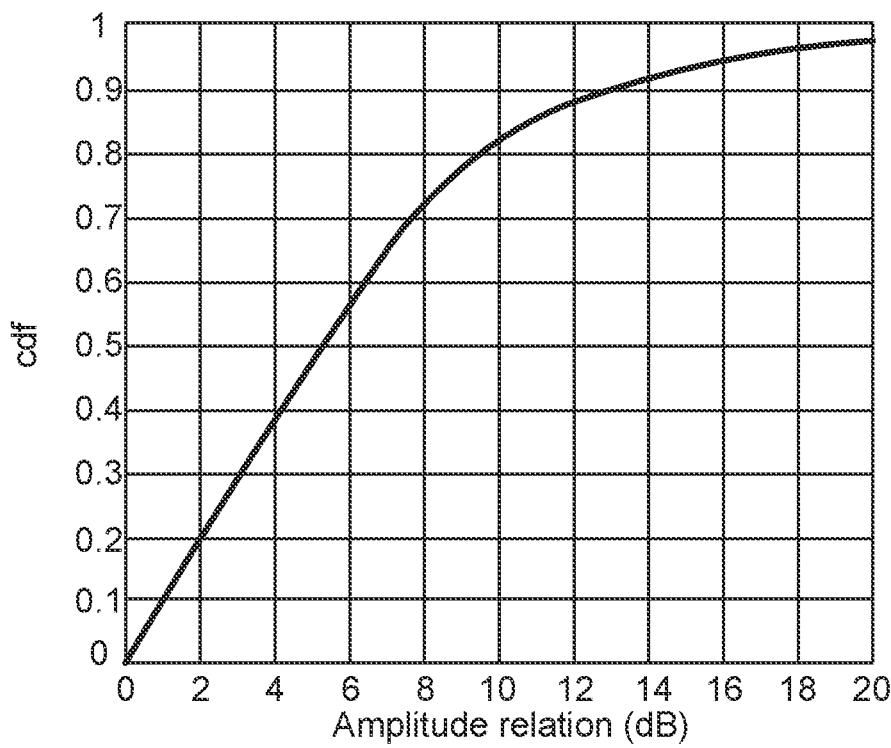
Figure 9:
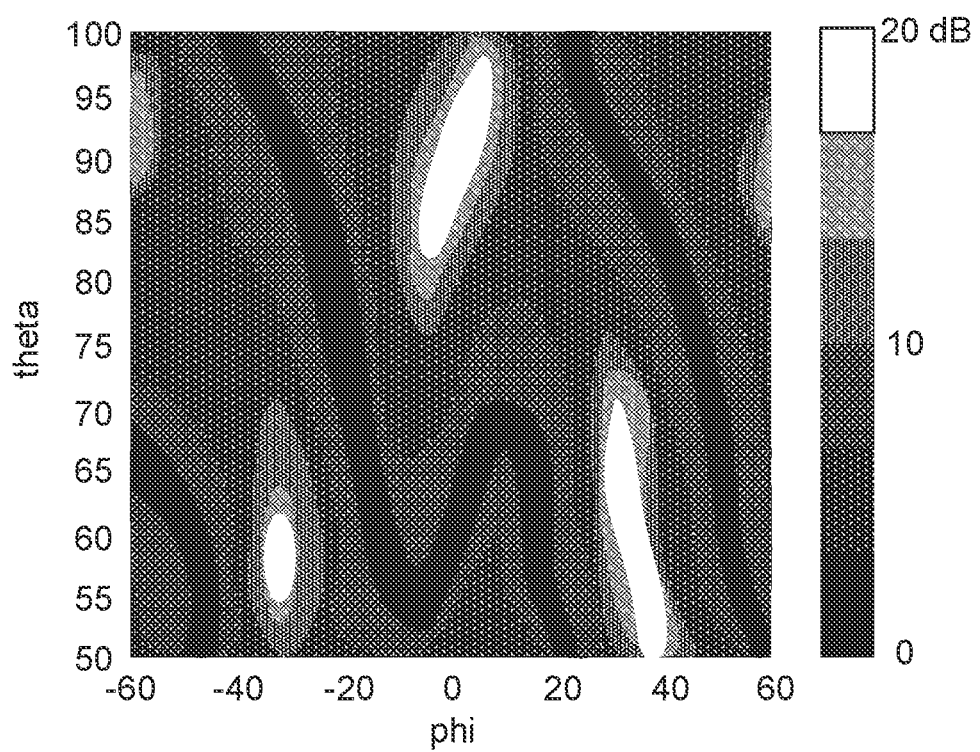

FIG. 8 schematically shows the cumulative distribution function of the amplitude relation (i.e. the absolute value of the difference in dB) between the two virtual antenna ports as measured over the coverage region as defined in FIG. 9 for the architecture of FIG. 3 and the above disclosed first embodiment. That is, the absolute difference in power between the two virtual antenna ports was measured per direction, and a cumulative distribution function was then formed from the measurements. For about 30% of the composite beamwidth 170, 180 the power differs 3 dB or less between the two virtual antenna ports, and for about 70% of the composite beamwidth 170, 180 the power differs 8 dB or less between the two virtual antenna ports.

FIG. 9 schematically shows a simplified heat map of the amplitude relation (i.e. difference in dB) between the two virtual antenna ports as measured over the coverage region extending in elevation between 50° to 100° according to the angular span of theta and in azimuth from −60° to +60° according to the angular span of phi.

Figure 10:
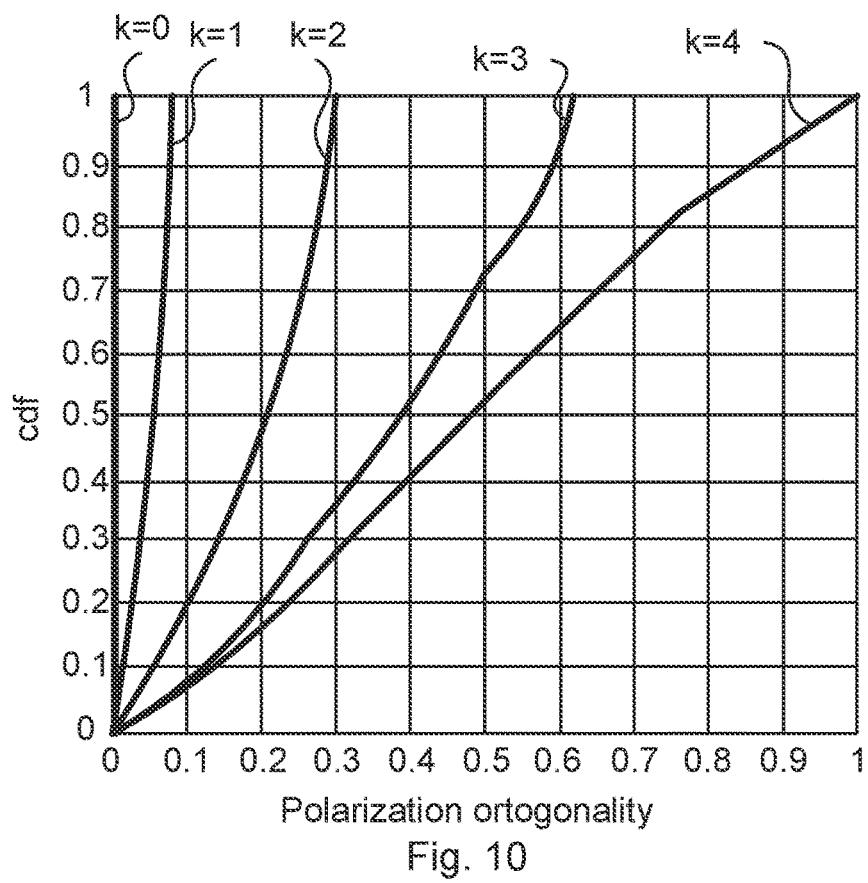
Figure 11:
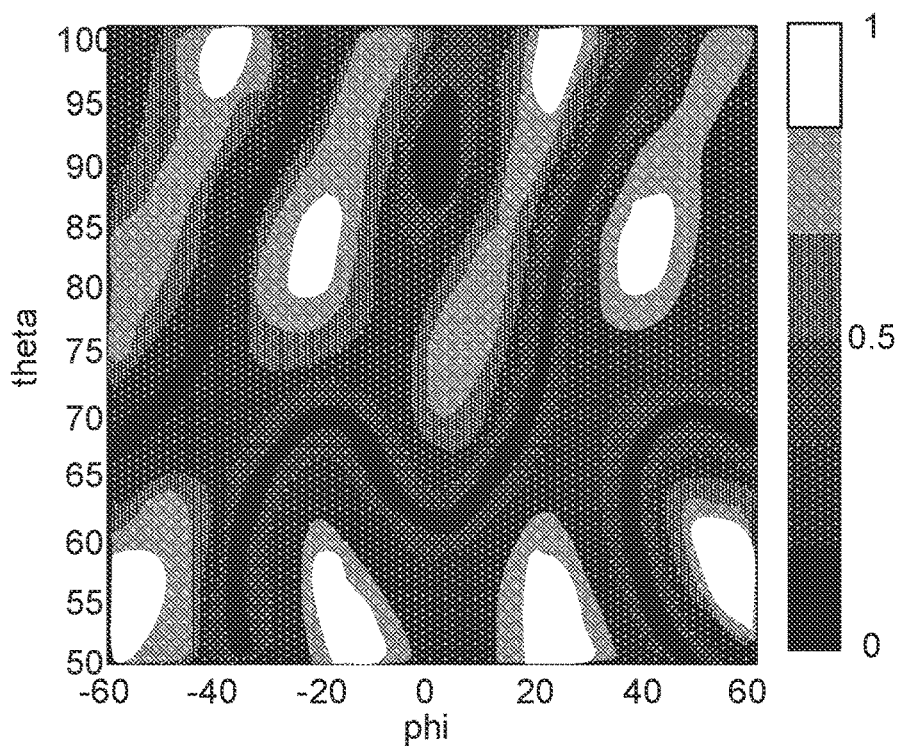

FIG. 10 schematically shows the cumulative distribution function of the polarization orthogonality between the two virtual antenna ports as measured over the coverage region as defined in FIG. 11 for the phase relation $\varphi_{21} - \varphi_{11} - \varphi_{22} = k\pi/4$, where k=0, 1, 2, 3, 4 for the architecture of FIG. 4 and the above disclosed second embodiment. That is, for each value of k the difference in polarization between the two virtual antenna ports was calculated per direction, and a cumulative distribution function was then formed from the measurements.

A polarization orthogonality of 1 means that the two virtual antenna ports have orthogonal polarization, whereas a polarization orthogonality of 0 means that the two virtual antenna ports have parallel polarization. For k=4, the fraction of the composite beamwidth 170, 180 with high polarization orthogonality is fairly large, for example 50% of the area has a polarization orthogonality better than 0.5.

FIG. 11 schematically shows a simplified heat map of the polarization parallellity (defined as 1−polarization orthogonality) between the two virtual antenna ports as calculated over the coverage region extending in elevation between 50° to 100° according to the angular span of theta and in azimuth from −60° to +60° according to the angular span of phi. In around 50% of the directions the polarization parallellity is below 0.5, which will substantially reduce the risk of polarization mismatching.

Figure 12:
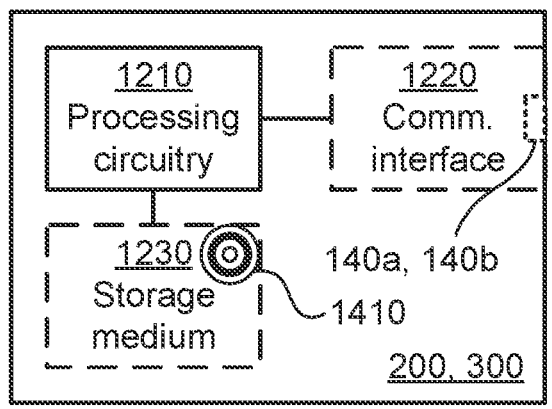
FIG. 12 is a schematic diagram showing functional units of a radio transceiver device according to an embodiment.

FIG. 12 schematically illustrates, in terms of a number of functional units, the components of a radio transceiver device 200, 300 according to an embodiment. Processing circuitry 1210 is provided using any combination of one or more of a suitable central processing unit (CPU), multiprocessor, microcontroller, digital signal processor (DSP), etc., capable of executing software instructions stored in a computer program product 1410 (as in FIG. 14), e.g. in the form of a storage medium 1230. The processing circuitry 1210 may further be provided as at least one application specific integrated circuit (ASIC), or field programmable gate array (FPGA).

Particularly, the processing circuitry 1210 is configured to cause the radio transceiver device 200, 300 to perform a set of operations, or steps, as disclosed above. For example, the storage medium 1230 may store the set of operations, and the processing circuitry 1210 may be configured to retrieve the set of operations from the storage medium 1230 to cause the radio transceiver device 200, 300 to perform the set of operations. The set of operations may be provided as a set of executable instructions.

Thus the processing circuitry 1210 is thereby arranged to execute methods as herein disclosed. The storage medium 1230 may also comprise persistent storage, which, for example, can be any single one or combination of magnetic memory, optical memory, solid state memory or even remotely mounted memory. The radio transceiver device 200, 300 may further comprise a communications interface 1220 at least configured for communications with other devices, nodes, functions, and entities, such as another radio transceiver device 200, 300. As such the communications interface 1220 may comprise one or more transmitters and receivers, comprising analogue and digital components. In this respect, the communications interface 1220 might comprise the antenna arrangement 140a, 140b.

The processing circuitry 1210 controls the general operation of the radio transceiver device 200, 300 e.g. by sending data and control signals to the communications interface 1220 and the storage medium 1230, by receiving data and reports from the communications interface 1220, and by retrieving data and instructions from the storage medium 123o. Other components, as well as the related functionality, of the radio transceiver device 200, 300 are omitted in order not to obscure the concepts presented herein.

Figure 13:
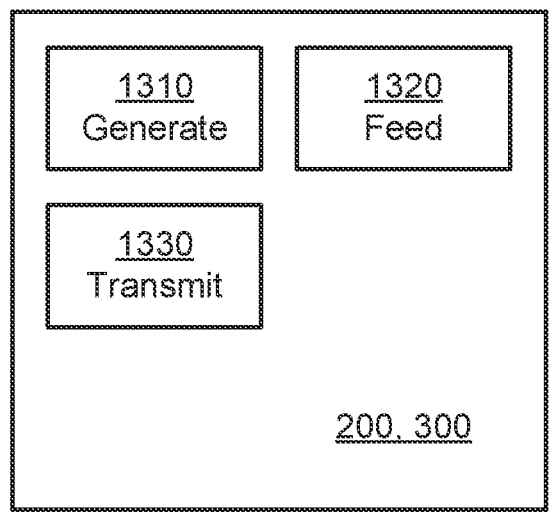
FIG. 13 is a schematic diagram showing functional modules of a radio transceiver device according to an embodiment.

FIG. 13 schematically illustrates, in terms of a number of functional modules, the components of a radio transceiver device 200, 300 according to an embodiment. The radio transceiver device 200, 300 of FIG. 13 comprises a number of functional modules; a generate module 1310 configured to perform step S102, a feed module 1320 configured to perform step S104, and a transmit module 1330 configured to perform step S106. The radio transceiver device 200, 300 of FIG. 13 may further comprise a number of optional functional modules. In general terms, each functional module 131o-133o may in one embodiment be implemented only in hardware and in another embodiment with the help of software, i.e., the latter embodiment having computer program instructions stored on the storage medium 1230 which when run on the processing circuitry makes the radio transceiver device 200, 300 perform the corresponding steps mentioned above in conjunction with FIG. 13. It should also be mentioned that even though the modules correspond to parts of a computer program, they do not need to be separate modules therein, but the way in which they are implemented in software is dependent on the programming language used.

Preferably, one or more or all functional modules 1310-1330 may be implemented by the processing circuitry 1210, possibly in cooperation with the communications interface 1220 and/or the storage medium 1230. The processing circuitry 1210 may thus be configured to from the storage medium 1230 fetch instructions as provided by a functional module 1310-133o and to execute these instructions, thereby performing any steps as disclosed herein.

Examples of radio transceiver devices have been disclosed above. Further, the radio transceiver device 200, 300 may be provided as a standalone device or as a part of at least one further device. For example, the radio transceiver device 200, 300 may be provided in a network node of the radio access network or in a node of the core network or in a terminal device.

Further, a first portion of the instructions performed by the radio transceiver device 200, 300 may be executed in a first device, and a second portion of the of the instructions performed by the radio transceiver device 200, 300 may be executed in a second device; the herein disclosed embodiments are not limited to any particular number of devices on which the instructions performed by the radio transceiver device 200, 300 may be executed. Hence, the methods according to the herein disclosed embodiments are suitable to be performed by a radio transceiver device 200, 300 residing in a cloud computational environment. Therefore, although a single processing circuitry 1210 is illustrated in FIG. 12 the processing circuitry 1210 may be distributed among a plurality of devices, or nodes. The same applies to the functional modules 1310-1330 of FIG. 13 and the computer program 1420 of FIG. 14 (see below).

Figure 14:
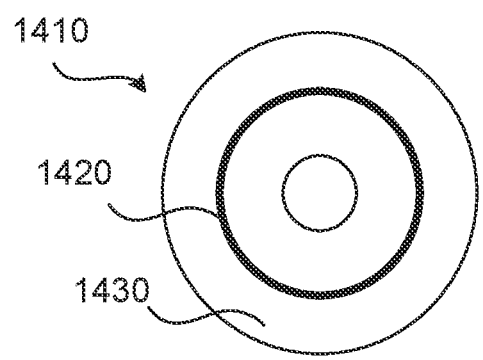
FIG. 14 shows one example of a computer program product comprising computer readable storage medium according to an embodiment.

FIG. 14 shows one example of a computer program product 1410 comprising computer readable storage medium 1430. On this computer readable storage medium 1430, a computer program 1420 can be stored, which computer program 1420 can cause the processing circuitry 1210 and thereto operatively coupled entities and devices, such as the communications interface 1220 and the storage medium 1230, to execute methods according to embodiments described herein. The computer program 1420 and/or computer program product 1410 may thus provide means for performing any steps as herein disclosed.

In the example of FIG. 14, the computer program product 1410 is illustrated as an optical disc, such as a CD (compact disc) or a DVD (digital versatile disc) or a Blu-Ray disc. The computer program product 1410 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1420 is here schematically shown as a track on the depicted optical disk, the computer program 1420 can be stored in any way which is suitable for the computer program product 1410.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for transmitting a two-port reference signal from an analog antenna array of an antenna arrangement, the analog antenna array comprising antenna elements of two polarizations, where all antenna elements of each polarization are connected to a respective physical antenna port, the method comprising:
generating two virtual antenna ports, one for each of the two ports of the reference signal;
feeding the reference signal from the two virtual antenna ports to the two physical antenna ports via a virtualization network; and
transmitting, via the antenna elements, the reference signal from the two physical antenna ports over a composite beamwidth in different spatial coverage per polarization for each of the two physical antenna ports whereby the transmitted reference signal, over the composite beamwidth, varies between having rank 1 and rank 2.

2. The method according to claim 1, wherein the transmitted reference signal, over the composite beamwidth, varies between having rank 1 and rank 2 by that the two ports of the reference signal have mutually different spatial coverage of over the composite beamwidth.

3. The method according to claim 1, wherein the two virtual antenna ports have mutually different power patterns over the composite beamwidth.

4. The method according to claim 3, wherein the mutually different power patterns are mutually complementary.

5. The method according to claim 1, wherein each of the two virtual antenna ports, via the virtualization network, only is operatively connected so as to feed a respective one of the two physical antenna ports.

6. The method according to claim 1, wherein the transmitted reference signal, over the composite beamwidth, varies between having rank 1 and rank 2 by that the two ports of the reference signal have varying polarization orthogonality over the composite beamwidth.

7. The method according to claim 1, wherein the two virtual antenna ports have identical power patterns.

8. The method according to claim 1, wherein each of the two virtual antenna ports, via the virtualization network, is operatively connected so as to feed both of the two physical antenna ports.

9. The method according to claim 1, wherein the virtualization network is defined by a weighting matrix W, such that:

$$\begin{bmatrix} y_1 \\ y_2 \end{bmatrix} = W \begin{bmatrix} x_1 \\ x_2 \end{bmatrix},$$

where $y_1$ represents a first of the two physical antenna ports, where $y_2$ represents a second of the two physical antenna ports, where $x_1$ represents a first of the two virtual antenna ports, and where $x_2$ represents a second of the two virtual antenna ports.

10. The method according to claim 9, wherein the weighting matrix W is given by:

$$W = \frac{1}{\sqrt{2}} \begin{bmatrix} e^{i\varphi_{11}} & e^{i\varphi_{21}} \\ 1 & e^{i\varphi_{22}} \end{bmatrix},$$

where $\varphi_{11}$, $\varphi_{21}$, $\varphi_{22}$, are phase shift values.

11. The method according to claim 10, wherein the relation $\varphi_{21}-\varphi_{11}-\varphi_{22}$ takes a value in the interval $[0, \ldots, 2\pi]$.

12. The method according to claim 10, wherein $\varphi_{21}-\varphi_{11}-\varphi_{22}=1$.

13. The method according to claim 9, wherein the weighting matrix W is given by:

$$W = \frac{1}{\sqrt{2}}\begin{bmatrix} e^{i\varphi_{11}} & e^{i(\varphi_{11}+\pi/2)} \\ 1 & e^{-i\pi/2} \end{bmatrix},$$

where $\varphi_{11}$ is a phase shift value.

14. The method according to claim 1, wherein the two polarizations are mutually orthogonal.

15. The method according to claim 1, wherein the reference signal is transmitted as part of a beam management procedure.

16. The method according to claim 1, wherein the antenna arrangement is part of a network node.

17. The method according to claim 1, wherein the antenna arrangement is part of a terminal device.

18. A radio transceiver device for transmitting a two-port reference signal from an analog antenna array of an antenna arrangement, the analog antenna array comprising antenna elements of two polarizations, where all antenna elements of each polarization are connected to a respective physical antenna port, the radio transceiver device comprising processing circuitry, the processing circuitry being configured to cause the radio transceiver device to:
   generate two virtual antenna ports, one for each of the two ports of the reference signal;
   feed the reference signal from the two virtual antenna ports to the two physical antenna ports via a virtualization network; and
   transmit, via the antenna elements, the reference signal from the two physical antenna ports over a composite beamwidth in different spatial coverage per polarization for each of the two physical antenna ports whereby the transmitted reference signal, over the composite beamwidth, varies between having rank 1 and rank 2.

19. The radio transceiver device according to claim 18, wherein the transmitted reference signal, over the composite beamwidth, varies between having rank 1 and rank 2 by that the two ports of the reference signal have mutually different spatial coverage of over the composite beamwidth.

20. A computer program product for transmitting a two-port reference signal from an analog antenna array of an antenna arrangement, the analog antenna array comprising antenna elements of two polarizations, where all antenna elements of each polarization are connected to a respective physical antenna port, the computer program product comprising a non-transitory computer readable storage medium storing computer code which, when run on processing circuitry of a radio transceiver device, causes the radio transceiver device to:
   generate two virtual antenna ports, one for each of the two ports of the reference signal;
   feed the reference signal from the two virtual antenna ports to the two physical antenna ports via a virtualization network; and
   transmit, via the antenna elements, the reference signal from the two physical antenna ports over a composite beamwidth in different spatial coverage per polarization for each of the two physical antenna ports whereby the transmitted reference signal, over the composite beamwidth, varies between having rank 1 and rank 2.

* * * * *